(12) United States Patent
Waffle (10) Patent No.: US 10,436,094 B2
(45) Date of Patent: Oct. 8, 2019

(54) SWAGED SHELL

(71) Applicant: ACAT Global, Charlevoix, MI (US)

(72) Inventor: Randy E. Waffle, Bellaire, MI (US)

(73) Assignee: ACAT Global, Charlevoix, MI (US)

( * ) Notice: Subject to any disclaimer, the term of this patent is extended or adjusted under 35 U.S.C. 154(b) by 0 days.

(21) Appl. No.: 15/418,898

(22) Filed: Jan. 30, 2017

(65) Prior Publication Data

US 2018/0216513 A1    Aug. 2, 2018

(51) Int. Cl.
*F01N 3/28* (2006.01)
*B01D 53/94* (2006.01)
*F01N 13/18* (2010.01)

(52) U.S. Cl.
CPC .......... *F01N 3/2842* (2013.01); *B01D 53/94* (2013.01); *F01N 3/281* (2013.01); *F01N 13/185* (2013.01); *B01D 2255/92* (2013.01); *F01N 2350/02* (2013.01); *F01N 2450/02* (2013.01); *F01N 2450/20* (2013.01)

(58) Field of Classification Search
CPC ... F01N 3/2842; F01N 2450/20; B01D 53/94; B01D 2255/92
USPC .................................. 422/177, 180; 55/523
See application file for complete search history.

(56) References Cited

U.S. PATENT DOCUMENTS

| 3,798,006 | A |   | 3/1974  | Balluff |
| 3,947,252 | A |   | 3/1976  | Musall et al. |
| 4,144,627 | A |   | 3/1979  | Noda et al. |
| 4,158,037 | A |   | 6/1979  | Aoyama |
| 4,504,294 | A | * | 3/1985  | Brighton ............ B01D 46/2407 422/179 |
| 4,559,205 | A |   | 12/1985 | Hood |
| 4,793,136 | A | * | 12/1988 | Whittenberger ... B01D 53/9454 422/177 |
| 4,851,015 | A |   | 7/1989  | Wagner et al. |
| 4,867,768 | A |   | 9/1989  | Wagner et al. |
| 5,724,735 | A | * | 3/1998  | Ickes ..................... F01N 3/2857 29/890 |
| 5,866,079 | A |   | 2/1999  | Machida et al. |
| 6,491,878 | B1 | * | 12/2002 | Locker .................. F01N 3/2853 422/179 |

(Continued)

FOREIGN PATENT DOCUMENTS

EP   0921282 A2 *   6/1999   ........... F01N 3/2853

*Primary Examiner* — Tom P Duong
(74) *Attorney, Agent, or Firm* — Butzel Long, PC; Gunther J. Evanina (57) ABSTRACT

In one embodiment, there is disclosed an apparatus for decontaminating exhaust gasses. The apparatus includes a monolith catalytic substrate having a length and a width. The substrates length separates first and second opposed ends. The first end and second ends each have a one piece retention ring fitted thereon. The apparatus includes a housing having a length separating opposed, spaced apart open first and second ends. The housing has a side wall extending substantially unbroken there between to define a body having an interior space. The monolith catalytic substrate is disposed in said interior space. The housing has a greater length than said monolith catalytic substrate. The substrate is centered in the housing and the housing is swaged at the first and second ends respectively to engage the retention rings and retain the monolith catalytic substrate within the interior space in said housing.

13 Claims, 7 Drawing Sheets

(56) References Cited

U.S. PATENT DOCUMENTS

| | | | |
|---|---|---|---|
| 7,252,808 B2* | 8/2007 | Tursky | B01D 53/9454 |
| | | | 29/890 |
| 7,441,334 B2* | 10/2008 | Roe | F01N 3/2853 |
| | | | 29/890 |
| 7,587,819 B1 | 9/2009 | Hall, Jr. | |
| 2002/0106312 A1* | 8/2002 | Harris | B01D 53/9454 |
| | | | 422/168 |
| 2004/0213708 A1 | 10/2004 | Wagner et al. | |
| 2005/0207948 A1 | 9/2005 | Borneby | |
| 2007/0148058 A1 | 6/2007 | Buckel et al. | |
| 2007/0243116 A1 | 10/2007 | Mueller-Haas | |
| 2009/0301065 A1* | 12/2009 | Wei | F01N 3/10 |
| | | | 60/286 |

* cited by examiner

SWAGED SHELL

TECHNICAL FIELD

The containment of various sized and shaped monolith catalytic substrates within a shell or housing has presented certain challenges to manufacturing. For larger automotive sized catalytic converters, the catalytic substrate is generally fitted at either end with a two piece end retention ring. These two piece retention rings are stamped using a progressive die. In high volume production environments, a progressive die is a very good due to fast production of the end ring pieces. However, progressive dies present the problem of initial high cost and lead times. This is especially apparent in low volume production components, where such high initial costs and long lead times are not warranted. In addition, end rings for small substrates are more difficult to stamp in a progressive die.

There remains a need for a low volume small catalytic substrate in a housing that is easy to make and cost effective.

SUMMARY

In one embodiment, the disclosure relates to an apparatus for decontaminating exhaust gasses from an internal combustion engine. The apparatus includes a monolith catalytic substrate having a length and a width separating first and second opposed ends. The first end of the substrate has a one piece retention ring fitted thereon, as does the second end. The catalyst and retention rings are disposed within a housing. The housing has a length separating opposed, spaced apart open first and second ends with a side wall extending substantially unbroken there between to define a body. The housing has an interior space defined by the sidewall. The housing has a greater length than the monolith catalytic substrate. The housing swaged at the first and second ends respectively to engage the retention rings and retain said monolith catalytic substrate within the interior space in the housing.

In another embodiment, a mantel may be affixed at either end of the housing. This may be accomplished by inserting a first diameter of the mantel into either or both ends of the housing and swaging the housing to affix the mantel to the housing.

DETAILED DESCRIPTION

Figure 1:
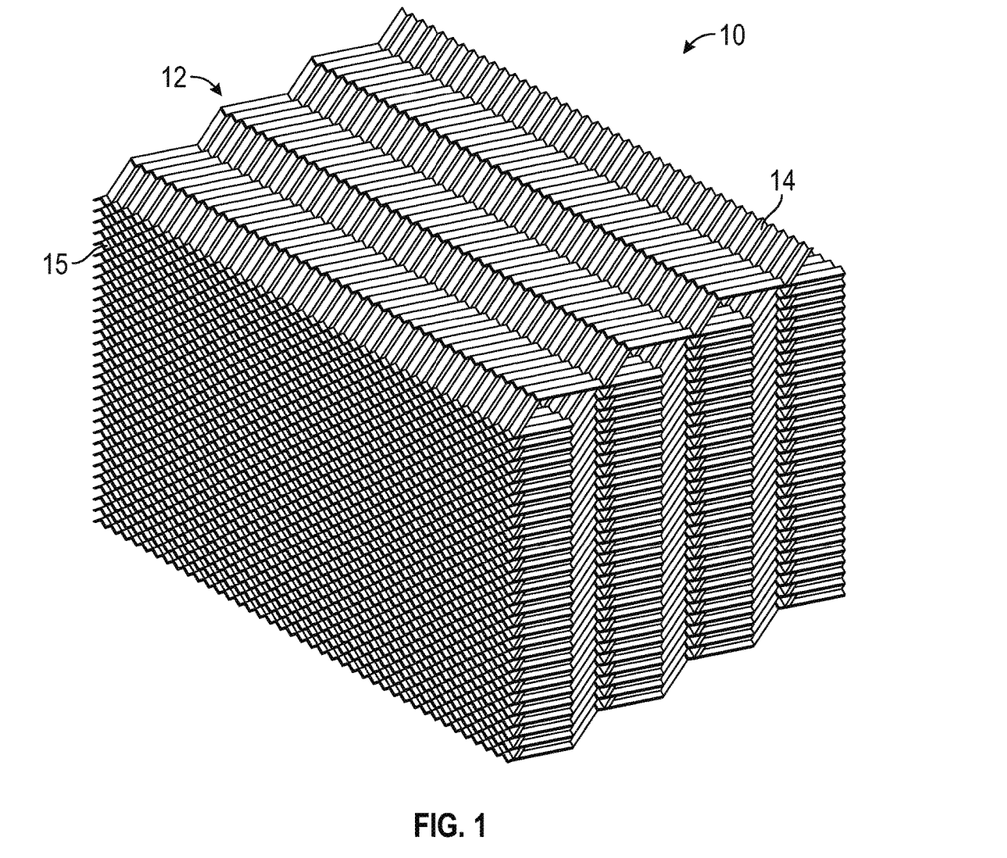
FIG. 1 is a perspective representation of a monolith catalytic substrate.

Turning now to the drawings wherein like numbers refer to like structures, FIG. 1 is a perspective representation of a monolith catalytic substrate 10. The substrate is generally a metal substrate that may be treated with catalysts 12 to treat exhaust gases from an internal combustion engine as disclosed in pending WIPO Application No. PCT/US2015/055711 assigned to assignee of this application. The substrate is folded into ordered folds 14 to present herring bone pattern passages 15 to permit exhaust gas to pass through the substrate along the passages to contact the catalyst layer and treat the exhaust gas.

Figure 2:
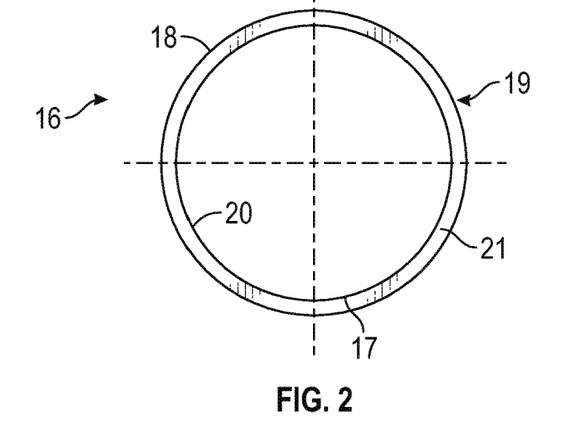
FIG. 2 is a frontal view of a retention ring
Figure 3:
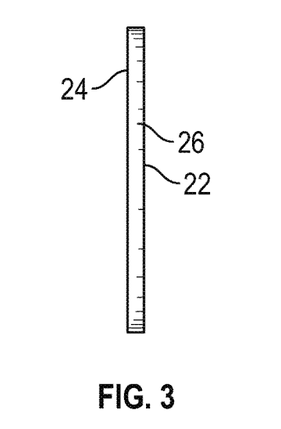
FIG. 3 is a side view of the retention ring of FIG. 2
Figure 4:
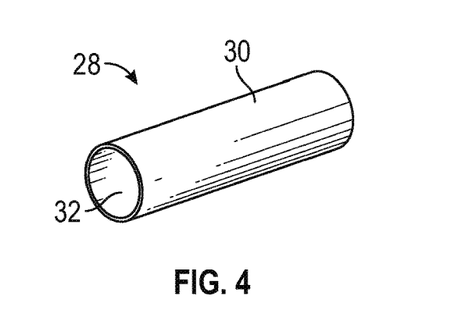
FIG. 4 is a perspective view of a tube from which the retention ring may be formed.
Figure 5:
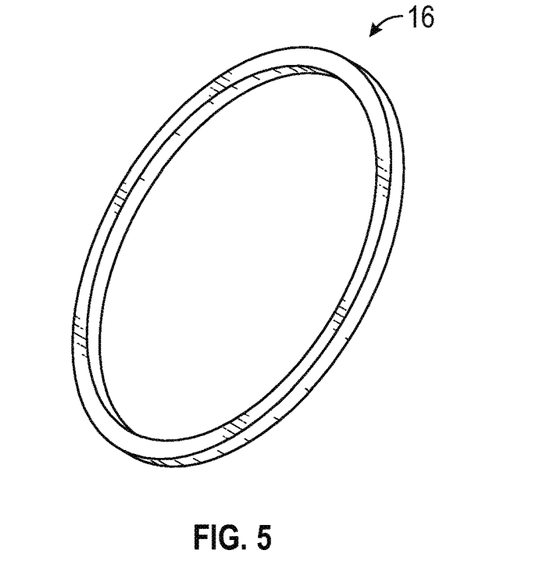
FIG. 5 is a perspective view of the retention ring of FIG. 2

FIG. 2 is a front view of a one piece retention ring 16. The retention ring has an outer surface 18 and an inner surface 20 separated by a sidewall 21 extending substantially unbroken therebetween to present a ring structure having an outer diameter 17 and an inner diameter 19. Turning now to FIG. 3, there is represented a side view of the retention ring 16. As seen from the side view, there is a first surface 22 and a second surface 24 separated by a sidewall 26. By comparing the side view with the front view as seen in FIG. 2, it may be understood that in this embodiment, the retention ring has a thin profile. The Retention ring may be formed from a tube 28, as seen in FIG. 4. The tube has an outer surface 30 and an inner surface 32. Portions of desired thickness may be cut from the tube to form the retention ring. FIG. 5 is a perspective view of the retention ring 16.

Figure 6:
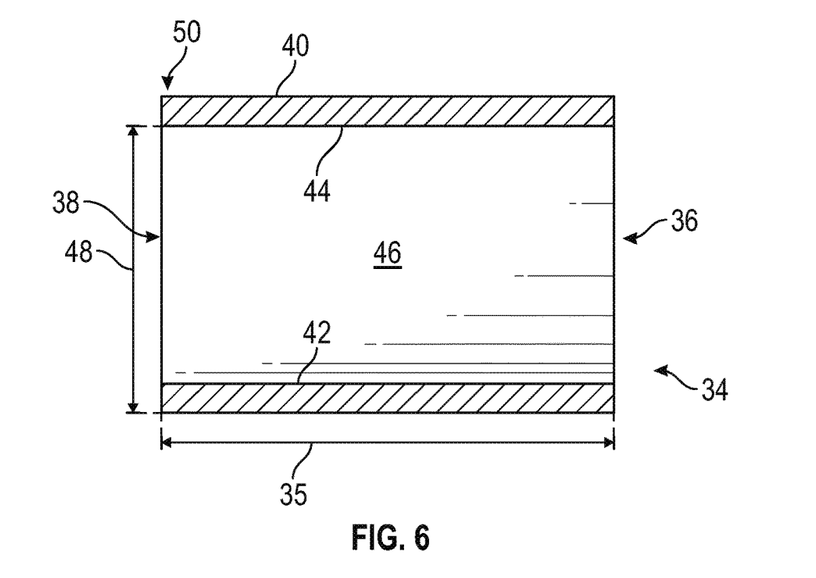
FIG. 6 is a cutaway side view of the unswaged housing.

Turning now to FIG. 6 there is shown a cutaway side view of an unswaged housing 34 having a length 35 and opposed first and second ends 36 and 38, respectively. The housing in this embodiment is shown as being cylindrical. The housing has an outer surface 40 (see FIGS. 6 and 10) extending substantially unbroken circumferentially separated from an inner surface 42 (see FIG. 6) by a sidewall 44 to define a tubular structure having an inner space 46 defined by the inner diameter 48. The outer diameter 50 is defined by the outer surface 40. The catalytic substrate is fitted into the inner space in the housing and a retention ring is fitted at each end of the substrate.

Figure 7:
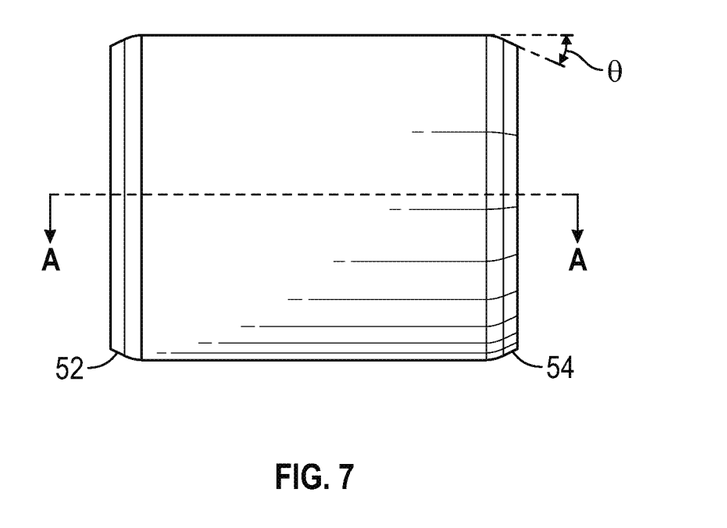
FIG. 7 is a schematic side view of the swaged housing containing the catalytic substrate.
Figure 8:
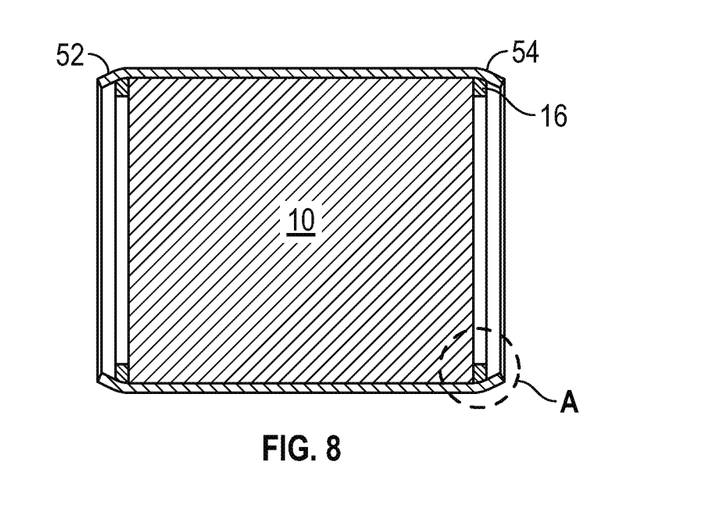
FIG. 8 is a cut away side view of the catalytic substrate in the housing taken along line A-A of FIG. 7.
Figure 9:
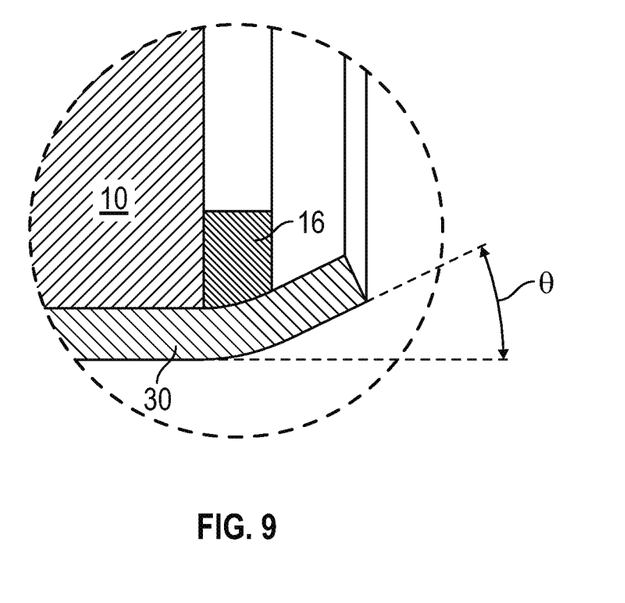
FIG. 9 is a detail view of Section A of FIG. 8 showing the interaction of the substrate, retention ring and the swaged housing.
Figure 10:
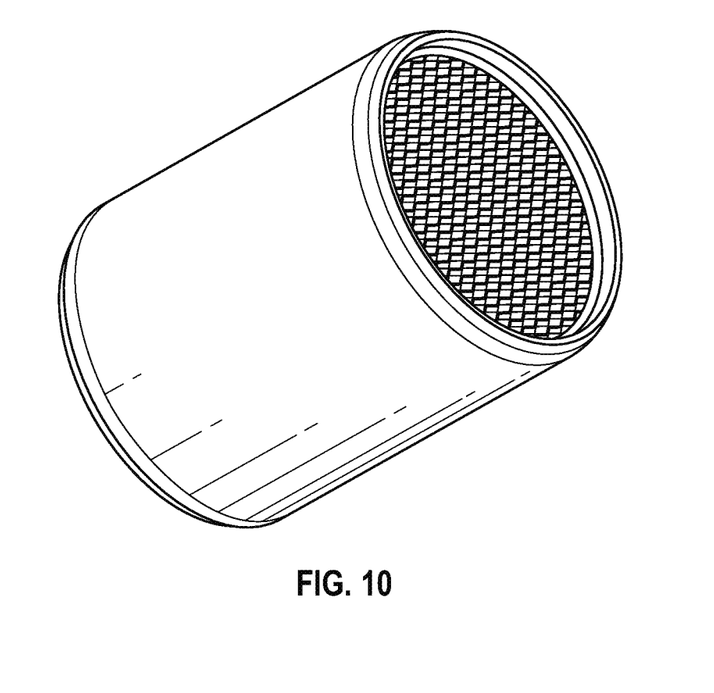
FIG. 10 is a perspective view of the catalytic converter substrate in the swaged housing.

Turning now to FIG. 7, there is shown a schematic representation of the housing swaged at the opposed first and second ends. The housing is swaged at the first and second ends 52 and 54, respectively, at an angle Θ, which may be from about 25 to 45 degrees. The housing is swaged by use of a tool that will be hereinafter described. FIG. 8 is a cutaway view of the housing of FIG. 7 taken along line A-A showing the substrate, the retention rings and the swaged housing. Specifically, the catalytic substrate 10 is shown between retention rings 16. The substrate and retention rings are held in place in the housing by a mechanical interaction between the housing in the swaged area and the retention ring at swaged surfaces 52 and 54, respectively. This may be seen in FIG. 9, which is a detailed view of section A in FIG. 8. Specifically, the housing is swaged by bending the housing at its periphery at angle on the opposed ends. The retention ring is contacted and the housing bent at angle Θ (which can be 25 to 45 degrees) around the perimeter of the ring. The retention ring 16 is adjacent to the catalytic substrate 10. When the housing is swaged, the bent housing surfaces 52, engages the retention ring 16 and forces the retention ring 16 against the catalytic substrate, thereby holding the catalytic substrate in place in the housing 30. As seen in FIG. 10, the swaged housing presents the catalytic substrate orthogonally relative to the housing end, thereby facilitating the passage of exhaust gasses there through to permit the cleaning of the exhaust gas from an internal combustion engine.

Figure 11:
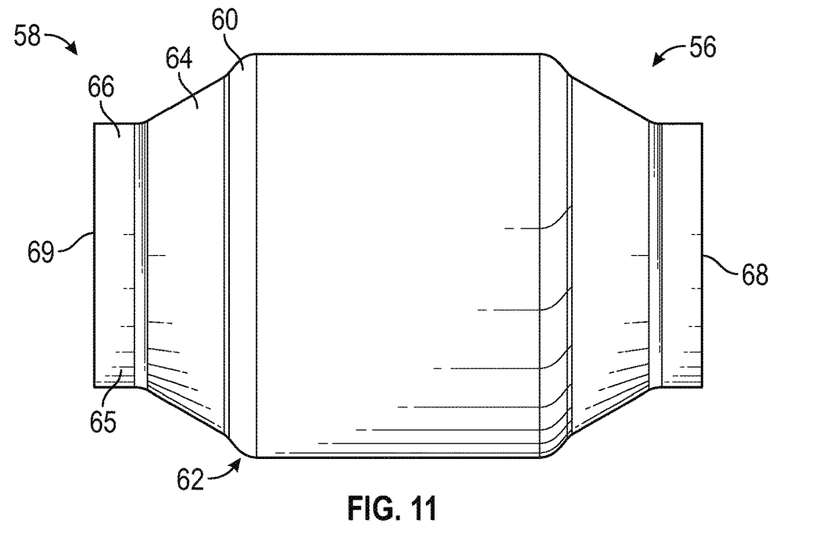
FIG. 11 is a side view of the catalytic converter in the housing with mantels attached at opposed ends of the housing.
Figure 12:
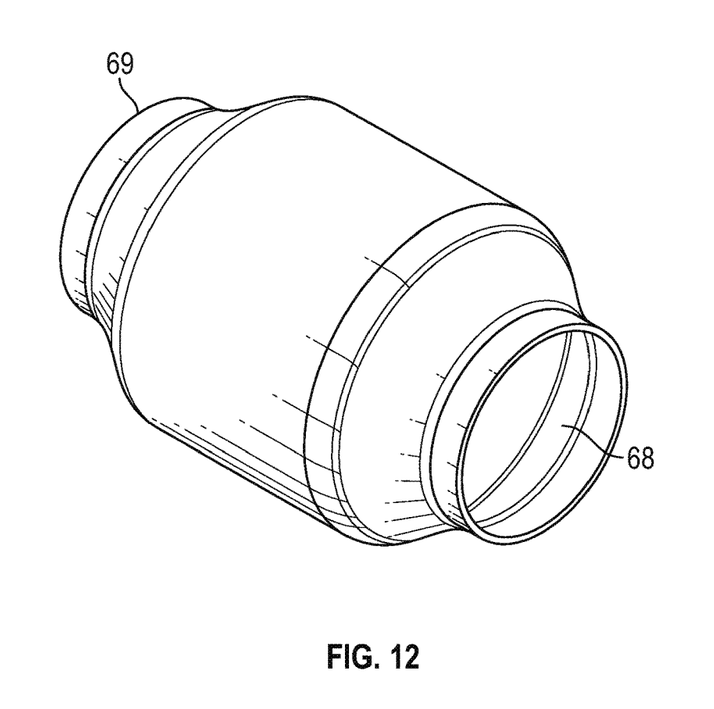
FIG. 12 is a perspective view of the converter in the housing with mantels at opposed ends.

Turning to FIG. 11, there is shown a side view of the swaged housing with mantels 56 and 58 affixed at opposed ends thereto. Mantels 56 and 58 may be formed separately and affixed to the swaged housing or they may be formed integral with the swaged housing during a bending process. If formed independently, the mantels may be formed by a die to reduce the diameter of the opening at either side of the housing to facilitate coupling with an exhaust system. In this regard it may be useful to create radiused portion 60 at a first mantel end 62 that may be matingly engagable to the swaged end of the housing. The radiused end is further formed into a frustro conical portion 64 to narrow the diameter of the housing end. The frustro conical portion terminates into a cylindrical portion 65 and a predetermined length 66 to permit coupling with an exhaust system. It will be appreciated by reference to FIG. 12, that the mantle is hollow, and terminates in an opposed open ends 68, 69. A similar or identical mantle may be used at either end of the housing depending upon the particular need occasioned by an exhaust system to which the mantles are joined.

Figure 13:
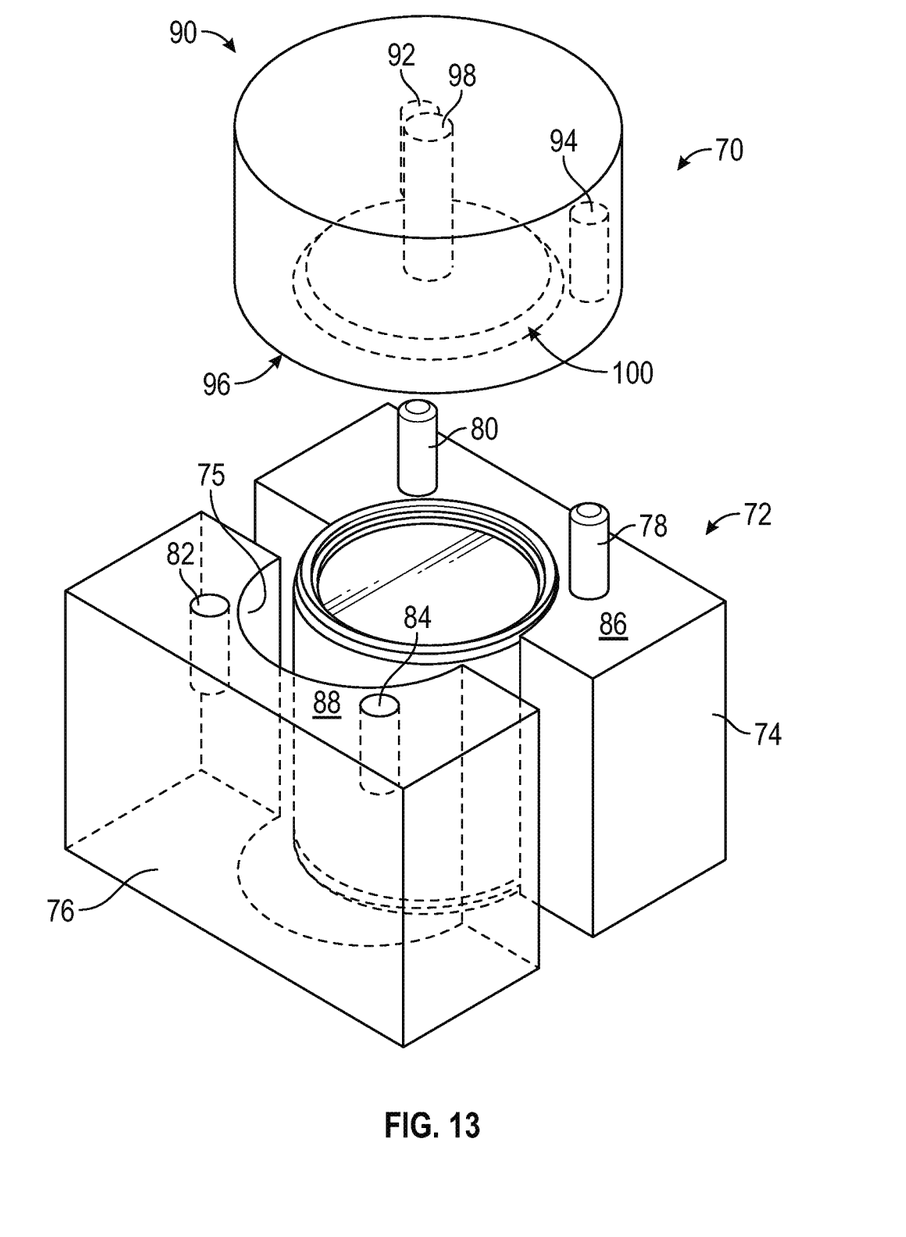
FIG. 13 is a schematic representation of a die tool.

FIG. 13 is a representation of the tooling 70 used to swage the ends of the housing against the retention rings as previously mentioned. Specifically, the housing with the retention rings and catalytic substrate is placed into a die 72 composed of opposed dies 74 and 76 configured at 75 to receive the housing with the substrate and retention rings in place without deforming the housing. Each of opposed dies 74 and 76 have guides 78, 80, 82 and 84 formed in the top surface 86 and 88, respectively. The guides may be either a protrusion as seen at 78 and 80, or they may be apertures to receive guides as seen at 82 and 84. Or the guides may be a combination of these structures. The tool may further include a swage die 90 having complimentary structures 92, 94 depending from its bottom surface 96. A spindle drive 98 is disposed relative to the swaged die and connected to a press in a manner known to those skilled in the art. The bottom surface of the swage die includes a swage ring 100 that is used to deform the housing swage surfaces at the preferred angle Θ when the tool is operated. In operation, dies 74 and 76 are closed around the housing to hold the housing in place. The catalytic substrate and retention ring are placed into position in the housing. The swage tool is then closed deforming the open end of the housing into a swaged end. The die is opened, the housing turned 180 degrees, the dies are closed and retention ring is put into place. The swage die is closed and the end is swaged.

While several embodiments have been described, it is apparent to those of ordinary skill in the art that the words used are not terms of limitation, but rather terms of description. Many variations and modifications are possible without departing from the scope and spirit of the invention as set forth in the appended claims.

What is claimed as new and desired to be protected by Letters Patent of the United States is:

1. An apparatus for decontaminating exhaust gasses, comprising:
    a monolith catalytic substrate; said substrate having a length and a width; said length separating first and second opposed ends; said first end having a one piece retention ring fitted thereon and said second end having a one piece retention ring fitted thereon;
    a housing having a length separating opposed, spaced apart open first and second ends with a side wall extending substantially unbroken there between to define a body; said housing having an interior space defined by said sidewall; said monolith catalytic substrate disposed in said interior space; said housing having a greater length than said monolith catalytic substrate; said housing swaged at said first and second ends respectively to engage said retention rings and retain said monolith catalytic substrate within said interior space in said housing, each of the retention rings disposed entirely between the swaged portion of the housing and a respective one of the opposite ends of said substrate.

2. The apparatus of claim 1, wherein said monolith substrate is centered along the length of the housing.

3. The apparatus of claim 1, wherein said housing ends are swaged at a 25 to 45 degree angle.

4. The apparatus of claim 1, wherein said housing is swaged at an angle dependent on housing profile, amount of material to be formed; and retention ring thickness.

5. The apparatus of claim 1, wherein said housing is contained within a tool die to facilitate being swaged without undue deformation of the housing.

6. The apparatus of claim 1, wherein said housing and said monolith catalytic substrate have a cylindrical profile.

7. The apparatus of claim 1, wherein said housing is tubular and said monolith catalytic substrate may be formed into a tubular profile, said catalyst with end rings insertable into said housing interior.

8. The apparatus of claim 1, wherein said catalytic substrate is non ceramic.

9. The apparatus of claim 1, wherein said retention rings are flat locking rings.

10. The apparatus of claim 9, wherein said locking rings are formed by cutting a tube of material into individual rings.

11. The apparatus of claim 1, further including at least one mantel affixed at a swaged end of the housing.

12. The apparatus of claim 11, wherein said mantel has a first diameter at a first end and second diameter at a second end; said first end diameter of said mantel matingly engageable with an end of said housing to affix the mantel in place with the housing.

13. An apparatus for decontaminating exhaust gases comprising:
    a catalytic substrate having a first end, an opposite second end, and lateral side wall extending along a length of the catalytic substrate between the first and second ends of the catalytic substrate;
    a housing surrounding the lateral side wall of the catalytic substrate and having first and second open ends respectively exposing the first and second ends of the catalytic substrate; and
    a first retention ring forced against the first end of the catalytic substrate by a bent perimeter of the first open end of the housing, and a second retention ring forced against the second end of the catalytic substrate by a bent perimeter of the second open end of the housing, whereby the catalytic substrate is held within the housing, the first and second retention rings entirely disposed between the bent perimeters of the housing and a respective one of the ends of the catalytic substrate.

* * * * *